W. BAKER.
STEAM VALVE.
APPLICATION FILED JAN. 27, 1908.
901,141.
Patented Oct. 13, 1908.
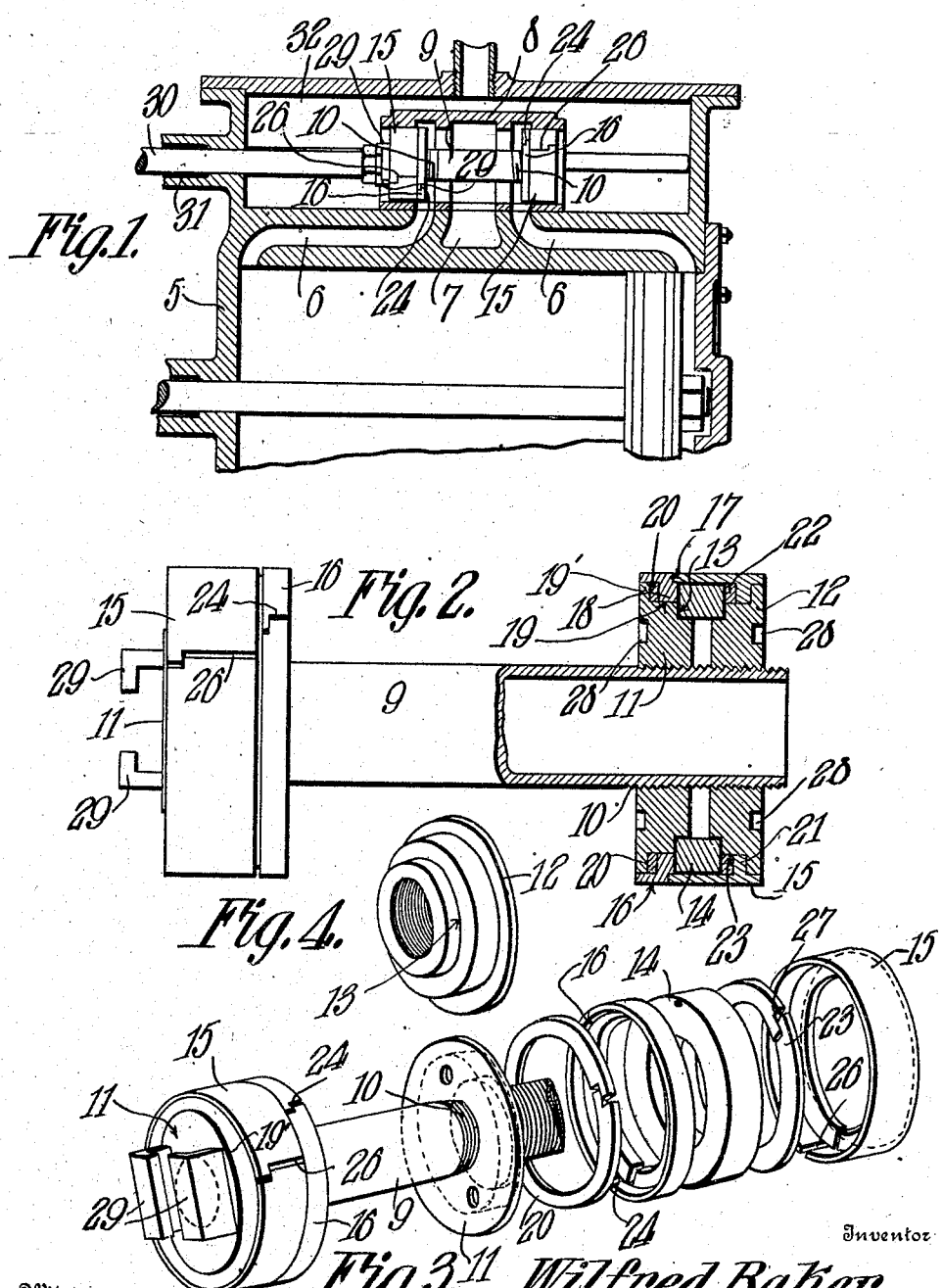
Witnesses
Inventor
Wilfred Baker.
By C. A. Snow & Co.
Attorneys

UNITED STATES PATENT OFFICE.

WILFRED BAKER, OF ABERDEEN, SOUTH DAKOTA.

STEAM-VALVE.

No. 901,141.        Specification of Letters Patent.        Patented Oct. 13, 1908.

Application filed January 27, 1908. Serial No. 412,849.

*To all whom it may concern:*

Be it known that I, WILFRED BAKER, a citizen of the United States, residing at Aberdeen, in the county of Brown and State of South Dakota, have invented a new and useful Steam-Valve, of which the following is a specification.

This invention relates to piston valves for steam engines and the like and more particularly to a novel form of packing ring for preventing leaking of steam as the valve reciprocates within the cage or casing.

The object of the invention is to provide a piston valve the heads of which may be adjusted longitudinally of the connecting stem or core so as to change the lead or lap of the valve.

A further object is to provide a balance valve having over-lapping main and auxiliary packing rings of different widths, said packing rings being each provided with an internal shoulder for the reception of a supplemental retaining ring thereby to prevent leakage of steam when the valve travels between the intake and exhaust ports.

A further object is to form each head of the valve with oppositely disposed clamping disks or members which bear against and serve to lock the several packing rings in engagement with a central spacing member or collar.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a side elevation partly in section of a piston valve constructed in accordance with my invention showing the same arranged within the valve casing or cage. Fig. 2 is an enlarged side elevation partly in section of the valve detached. Fig. 3 is a perspective view of the valve with the spacing collar and several clamping rings removed from the adjacent end of the supporting stem, one of the clamping disks comprising the head being omitted. Fig. 4 is a perspective view of one of the clamping heads detached.

Similar numerals of reference indicate corresponding parts in all of the figures of the drawings.

The improved piston valve forming the subject matter of the present invention is principally designed for use in connection with steam engines and the like and by way of illustration is shown in connection with a steam engine of the ordinary construction in which 5 designates the cylinder, 6 the inlet ports and 7 the exhaust port leading to the valve casing or cage 8.

The valve consists of a connecting stem 9 preferably tubular in form, as shown, and provided with exterior threads 10 for engagement with the oppositely disposed heads of the piston whereby said heads may be adjusted longitudinally of the stem so as to change the lead or lap of the valve.

Each head of the piston is formed with oppositely disposed clamping members or disks 11 and 12 having circumferential grooves 13 formed in their adjacent faces for the reception of a central spacing ring or collar 14.

Surrounding the clamping members 11 and 12 are main and auxiliary split packing rings 15 and 16 of different widths, the relatively narrow ring 16 being provided with an annular groove 17 for the reception of the adjacent end of the relatively wide ring 15 thereby to present a smooth unobstructed bearing surface for each head of the valve and also assist in preventing accidental displacement of the ring 16. The relatively narrow packing ring 16 is provided with an internal shoulder 18 which enters a recess 19 formed in the clamping member 11 and normally bears against said clamping member, as shown.

The shoulder 18 is spaced from the annular flange 19' of the clamping member 11 to form a pocket for the reception of a supplemental or retaining ring 20, which latter serves to prevent the steam from leaking into the exhaust port or cavity when the valve travels between the inlet and exhaust ports.

Extending inwardly from the main packing ring 15 is a shoulder 21 similar in construction to the shoulder 18 but preferably of less width than the latter, there being a supplemental retaining ring 22 bearing against the shoulder 21 and seated in the annular recess 23 of the clamping ring 12.

The auxiliary packing ring 16 is split transversely to form a lap joint 24, which latter also intersects the shoulder 18, there being a lap joint 25 formed in the retaining ring 20 and disposed in staggered relation with respect to the lap joint 24 so as to prevent leakage. The main ring 15 is also split transversely to form a lap joint 26 which intersects the shoulder 21 while the adjacent retaining ring 23 is provided with a lap joint 27 similar in construction to the lap joint 25 and disposed in spaced relation to the lap joint of the main ring 15.

The clamping disks 11 and 12 are provided with sockets 28 for the reception of a spanner or other suitable tool whereby said members may be clamped in engagement with the central supporting ring or collar 14 and thus lock the several packing rings in assembled position so as to effectually prevent accidental displacement of the same.

The clamping member 11 of one of the heads is provided with spaced guides preferably in the form of under cut ribs 29 adapted to receive the adjacent end of the valve stem 30, which latter passes through the stuffing box 31 of the steam chest 32 in the usual manner.

It will thus be seen that the opposite heads of the piston may be adjusted longitudinally of the connecting stem 9 so as to change the lead or lap of the valve while the clamping members of either head may be unscrewed from the stem 9 so as to permit the removal of any of the packing rings when the latter become worn or otherwise impaired from constant use.

Attention is here called to the fact that by having the main ring 15 over lap the adjacent end of the auxiliary ring 16 a smooth unobstructed bearing surface is presented to the valve seat, while at the same time the auxiliary ring 16 is prevented from springing or expanding laterally when the valve is passed between ports.

A valve constructed in accordance with the present invention is strong and durable in construction and thoroughly efficient in operation and will effectually prevent the escape or leakage of steam at the periphery of the piston heads.

Having thus described the invention what is claimed is:

1. A piston including a threaded stem, spaced heads engaging the threads on the stem and adjustable longitudinally of the latter, over-lapping main and auxiliary split rings carried by each head and each provided with an inwardly extending shoulder, and split retaining rings bearing against the shoulders.

2. A piston including a threaded stem, spaced heads engaging the threads on the stem and adjustable longitudinally of the latter, main and auxiliary packing rings surrounding each head and each provided with an inwardly extending shoulder, said rings being of different widths and split transversely, and split retaining rings bearing against the shoulders.

3. A piston including a stem, spaced heads mounted on the stem and adjustable longitudinally of the latter, each head being formed of co-acting clamping members, a spacing collar interposed between the clamping members of each head, and transversely split packing rings surrounding each head, said rings being of different widths and each provided with an inwardly extending shoulder bearing against the adjacent clamping member.

4. A piston including a stem, spaced heads mounted on the stem and adjustable longitudinally of the latter, said heads being each formed with co-acting clamping members, a spacing collar interposed between each set of clamping members, main and auxiliary packing rings surrounding the clamping members and each provided with an internal shoulder, said packing rings being of different widths and split transversely with the end of one ring overlapping the end of an adjacent ring, and split retaining rings surrounding the clamping members and bearing against the adjacent shoulders.

5. A piston including a stem having external threads, a head mounted on the stem and including spaced clamping members engaging the threads on said stem, a collar interposed between the clamping members, main and auxiliary packing rings of different widths surrounding the clamping member and each provided with an internal shoulder, an expansible retaining ring interposed between one of the shoulders and the adjacent clamping ring and a similar retaining ring interposed between the collar and the other shoulder.

6. A piston including an externally threaded stem, a head including co-acting clamping members engaging the threads on the stem and provided with registering annular grooves, a spacing collar seated in said grooves, there being recesses formed in the clamping members adjacent said grooves, split rings of different widths surrounding the clamping members and each provided with an internal shoulder seated within the adjacent recess, and expansible retaining members surrounding the clamping members and bearing against the adjacent shoulders.

7. A piston including a stem, a head mounted on the stem and comprising spaced clamping members having their adjacent faces provided with circumferential grooves adapted to register with each other, a spacing collar seated in the grooves, there being a recess formed in each clamping member adjacent the groove, over-lapping packing rings of different widths surrounding the clamping members and each provided with an internal shoulder seated within the recess of the adjacent clamping member, said packing rings being provided with lap joints, retaining rings bearing against the shoulders and provided with lap joints disposed in staggered relation with respect to the lap joints of the packing rings, there being sockets formed in the exterior faces of the clamping members for the reception of a spanner whereby said clamping members may be locked in engagement with the spacing collar.

In testimony that I claim the foregoing as my own, I have hereto affixed my signature in the presence of two witnesses.

WILFRED BAKER.

Witnesses:
PARKER H. LYONS.
C. A. RUSSELL.